United States Patent
Tanquary et al.

(10) Patent No.: US 11,458,792 B2
(45) Date of Patent: Oct. 4, 2022

(54) METHODS AND APPARATUS FOR CENTER PIVOT SUSPENSION SYSTEM

(71) Applicants: Nate's Hot Rod Garage, LLC, Cave Creek, AZ (US); Diamondback Motorsports, LLC, Mesa, AZ (US)

(72) Inventors: Nathanial Tanquary, Cave Creek, AZ (US); Michael Martinez, Mesa, AZ (US)

(73) Assignees: Nate's Hot Rod Garage, LLC, Cave Creek, AZ (US); Diamondback Motorsports, LLC, Mesa, AZ (US)

( * ) Notice: Subject to any disclaimer, the term of this patent is extended or adjusted under 35 U.S.C. 154(b) by 1 day.

(21) Appl. No.: 17/087,797

(22) Filed: Nov. 3, 2020

(65) Prior Publication Data

US 2021/0129613 A1    May 6, 2021

Related U.S. Application Data

(60) Provisional application No. 62/930,059, filed on Nov. 4, 2019.

(51) Int. Cl.
  *B60G 11/08*    (2006.01)
  *B60G 7/00*    (2006.01)

(52) U.S. Cl.
  CPC .............. *B60G 11/08* (2013.01); *B60G 7/001* (2013.01); *B60G 2202/114* (2013.01)

(58) Field of Classification Search
  CPC .. B60G 11/08; B60G 7/001; B60G 2202/114; B60G 2200/31; B60G 9/003; B60G 2200/44; B60G 2202/14; B60G 11/40; B60G 11/22
  See application file for complete search history.

(56) References Cited

U.S. PATENT DOCUMENTS

| | | | | |
|---|---|---|---|---|
| 2,052,056 A * | 8/1936 | Stone | ..................... | B60G 11/08 280/86.751 |
| 2,122,961 A * | 7/1938 | Siebler | ..................... | B60G 7/02 280/86.751 |
| 2,145,670 A * | 1/1939 | Tjaarda | ................... | B60G 11/08 180/360 |
| 2,200,798 A * | 5/1940 | Megow | .................. | B60G 11/08 280/124.135 |
| 2,206,970 A * | 7/1940 | Megow | .................. | B60G 11/08 280/124.103 |
| 2,471,135 A * | 5/1949 | Wyeth | .................... | B60G 21/05 267/192 |
| 3,147,815 A * | 9/1964 | Arkus-Duntov | ....... | B60G 11/08 180/360 |
| 4,779,894 A * | 10/1988 | Cowburn | ............... | B60G 11/08 267/52 |
| 2003/0122338 A1* | 7/2003 | Carlstedt | ................ | B60G 21/05 280/124.134 |
| 2016/0339753 A1* | 11/2016 | Wallgren | ............... | B60G 7/008 |
| 2017/0305222 A1* | 10/2017 | Preijert | ................ | B60G 13/005 |

(Continued)

*Primary Examiner* — Darlene P Condra
(74) *Attorney, Agent, or Firm* — Noblitt & Newson, PLLC (57) ABSTRACT

A center pivot suspension system according to various aspects of the present technology may include a multi-piece axle having controls arms that are pivotally connected to a center beam section of the axle. Each control arm may be able to pivot about the center section independently from the opposing control arm. A leaf spring may be coupled to each control arm to help absorb loads applied to a given control arm.

12 Claims, 5 Drawing Sheets

(56) References Cited

U.S. PATENT DOCUMENTS

| | | | |
|---|---|---|---|
| 2018/0244120 A1* | 8/2018 | Higle | B60G 11/10 |
| 2019/0092113 A1* | 3/2019 | Girelli Consolaro | B60G 3/20 |
| 2019/0176554 A1* | 6/2019 | Meier | B60G 11/08 |
| | | | 180/360 |
| 2019/0241036 A1* | 8/2019 | Winter | B60G 13/005 |

* cited by examiner

METHODS AND APPARATUS FOR CENTER PIVOT SUSPENSION SYSTEM

CROSS-REFERENCES TO RELATED APPLICATIONS

This application claims the benefit of U.S. Provisional Patent Application No. 62/930,059, filed Nov. 4, 2019, and incorporates the disclosure of the application by reference.

BACKGROUND OF THE TECHNOLOGY

Suspension systems in older "classic" vehicles are commonly based on systems that use leaf springs. One common example is the use of a solid axle and single leaf spring used to absorb vertical loads applied to the axle through the wheels. A common shortcoming of this system is that forces applied to one wheel are transferred to the wheel on the other side of the axle. This transfer of forces causes disruptions to steering and general stability of the vehicle. For example, a condition known as bump steer occurs when one tire hits an object and the resulting impact force is transferred to the opposing tire causing the vehicle to momentarily lose control.

Modern suspension systems may solve these problems but change the appearance of the vehicle. For car owners seeking to retain the "classic" look of their vehicle a modern suspension system is unlikely to be used.

SUMMARY OF THE TECHNOLOGY

A center pivot suspension system according to various aspects of the present technology may include a multi-piece axle having controls arms that are pivotally connected to a center beam section of the axle. Each control arm may be able to pivot about the center section independently from the opposing control arm. A leaf spring may be coupled to each control arm to help absorb loads applied to a given control arm.

BRIEF DESCRIPTION OF THE DRAWINGS

A more complete understanding of the present technology may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in a different order are illustrated in the figures to help to improve understanding of embodiments of the present technology.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various materials, finishes, dimensions, and geometries, which may carry out a variety of operations suited to a specified application or environment. In addition, the present technology may be practiced in conjunction with any number of systems configured for operation with automobile suspension systems and steering systems, and the system described is merely one exemplary application for the technology. Further, the present technology may employ any number of conventional techniques for connecting, coupling, transferring motion, distributing loads, and steering.

Methods and apparatus for a center pivot suspension system according to various aspects of the present technology may operate in conjunction with any type of steering system or suspension technology. Various representative implementations of the present technology may be applied to retrofitting an older (classic) technology automobile suspension system to reduce or eliminate a condition commonly known as bump steer while maintaining an original factory "look" of a classic automobile. For example, the described technology may be used to replace an original factory installed suspension system incorporating a solid axle to provide enhanced driving characteristics and improved safety while maintaining the original factory installed appearance of the suspension system. Such an installation allows users to improve handling characteristics of a classic vehicle without significantly altering the outward appearance of the vehicle.

Referring to FIGS. 1-6, a center pivot suspension system 100 may generally comprise a multi-section axle beam 102, a spring control system 101 coupled to the axle beam 102, a pivotable steering link assembly 108 connected to a center section of the axle beam 102, a pair of steering linkages 104, 106 coupled to the steering link assembly 108, and a pair of trailing arms 110, 112 extending rearwardly from the axle beam 102 and configured to be pivotably connected to the frame of the vehicle. The center pivot suspension system 100 may be configured to fit at least partially within a suspension housing 114.

The multi-section axle beam 102 extends between a pair of opposing spindle assemblies 122, 124 and is configured to reduce the transfer of shocks or vibrations from one side of the beam to the other side beam. The multi-section axle beam 102 may comprise one or more sections configured to be coupled together to form a single beam structure extending between the spindle assemblies 122, 124. For example, in one embodiment, the multi-section axle beam 102 may comprise a passenger side control arm (right when viewed from the rear) 102a and a driver side control arm (left when viewed from the rear) 102c each connected on a first end to a center section 102b.

Figure 7:
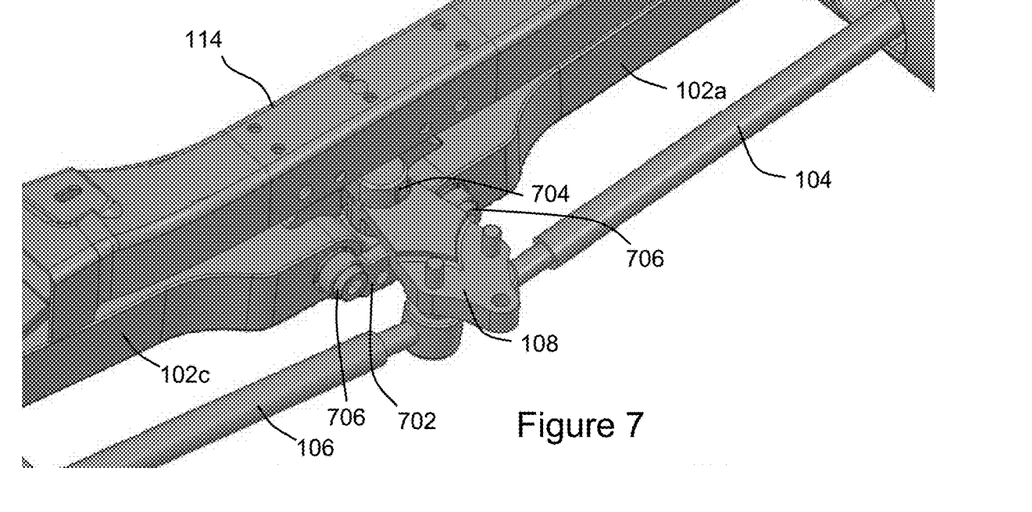
FIG. 7 representatively illustrates a detailed top perspective view of the center pivot assembly in accordance with an exemplary embodiment of the present technology.
Figure 8:
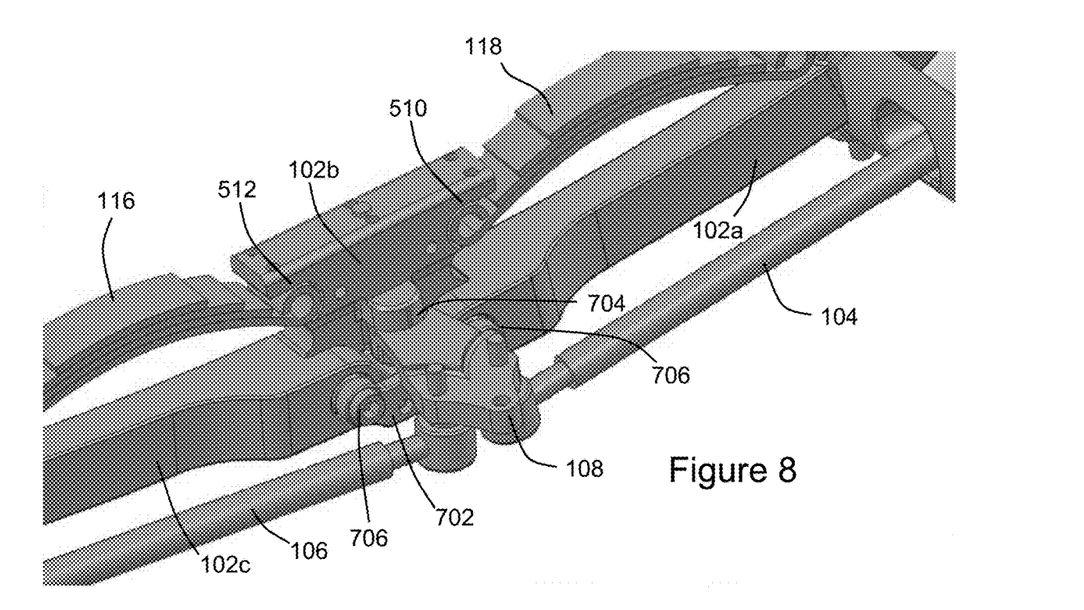
FIG. 8 representatively illustrates a detailed top perspective view of the center pivot assembly with the leaf spring cover removed in accordance with an exemplary embodiment of the present technology.
Figure 9:
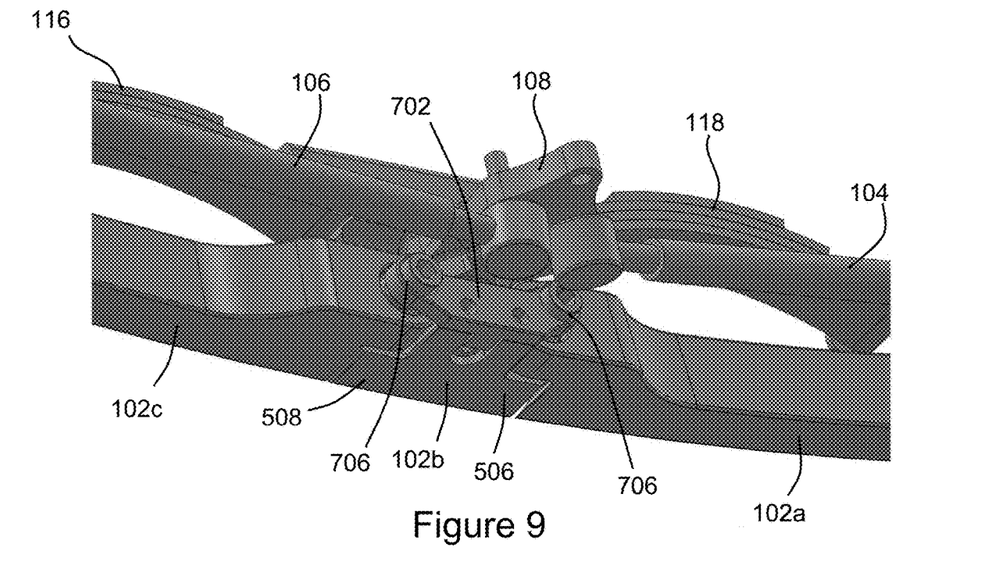
FIG. 9 representatively illustrates a detailed bottom perspective view of the center pivot assembly with the leaf spring cover removed in accordance with an exemplary embodiment of the present technology.

Referring now to FIGS. 7-9, the passenger side control arm 102a and the driver side control arm 102c may be coupled to the center section 102b by a lower arm bridge 702. The lower arm bridge 702 may be configured to allow each control arm 102a, 102c to flex or pivot relative to the center section 102b. Each control arm 102a, 102c may be allowed to pivot independently from the other such that a vertically oriented load applied to a first spindle assembly 122 is not completely transferred to the other spindle assembly 124. For example, an upward shock to the left spindle assembly 122 from a tire (not shown) hitting a bump on the road may be at least partially absorbed through the lower arm bridge 702 and center section 102b such that the full shock is not transferred to the opposing spindle assembly 124 and attached tire (not shown). Unlike a solid beam used in existing suspension systems, this arrangement helps at least partially decouple the driver side portion of the suspension from the passenger side portion of the suspension during driving conditions. The result is a reduction in force loads being transferred from one side to the other, which can upset the balance and stability of the vehicle during driving conditions.

Figure 10:
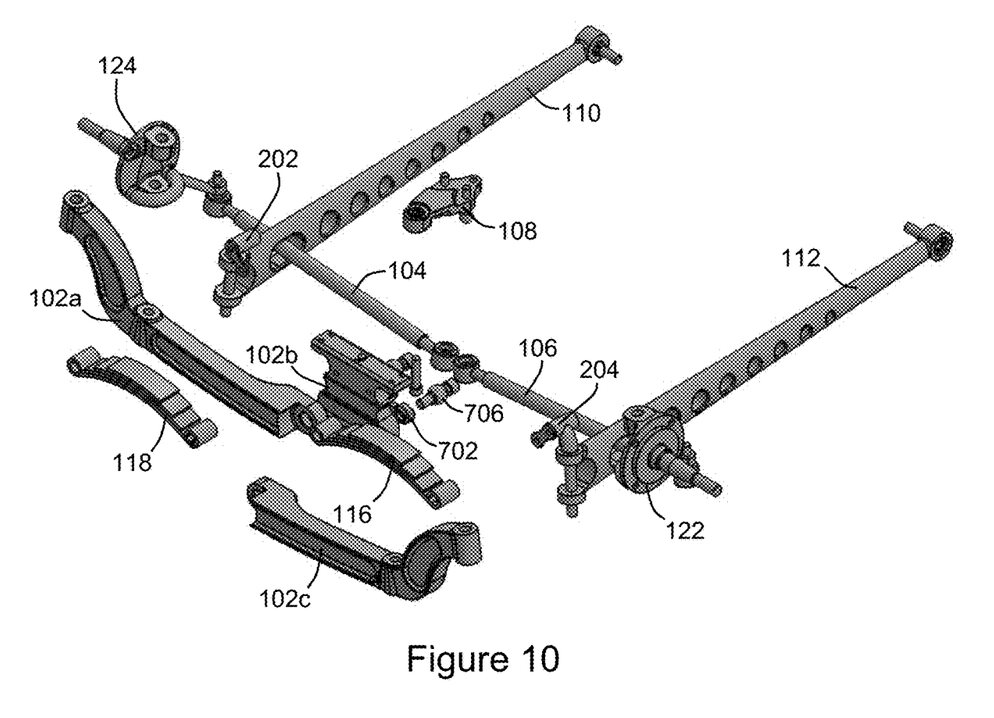
FIG. 10 representatively illustrates an exploded view of the center pivot suspension system in accordance with an exemplary embodiment of the present technology.

The two control arms 102a, 102c may be connected to the center section 102b and the lower arm bridge 702 by any suitable method that allows the control arms 102a, 102c to move relative to the center section 102b. For example, and with particular reference to FIGS. 9 and 10, each control arm 102a, 102c may be pivotally connected to the center section 102b by a pivot bolt 706 extending through the lower arm bridge 702 and the control arms 102a, 102c into the center section 102b. The pivot bolt 706 may comprise a surface configured to allow the respective control arm 102a, 102c to pivot or rotate vertically (upwardly and downwardly) relative to the center section 102b. In an alternative embodiment the control arms 102a, 102c may be connected to the center section 102b by a spring element suitably configured to allow the control arms 102a, 102c to pivot about the center section 102b.

The second end of each control arm 102a, 102c may be configured to be connected to a spindle assembly that may be attached to the wheels of the vehicle. With particular reference to FIGS. 1-3 and 5, the second end of each control arm 102a, 102c may curve upwards to an end that is configured to be connected to the respective spindle assembly 122, 124.

Referring now to FIGS. 5, 8, 9, and 10, the center section 102b is configured to link the control arms 102a, 102c together and form an axle while also allowing each control arm 102a, 102c to move vertically independent of the other control arm. The center section 102b may comprise any suitable structure or device for connecting the control arms 102a, 102c and allowing them to pivot about the center section 102b. For example, in one embodiment, the center section 102b may comprise a beam having a lower section and an upper section 120. A first side 506 of the lower section may be configured to connect to a first end of the passenger side control arm 102a and an opposing second side 508 of the lower section may be configured to connect to a first end of the driver side control arm 102c.

The spring control system 101 helps absorb loads applied during driving conditions to the wheels. The spring control system 101 may comprise any suitable system for absorbing loads such as: torsion bars, shock absorbers, leaf springs, coil over shocks, and the like. Referring now to FIGS. 2, 4, 5, 8, 9, and 10, in one embodiment, the spring control system 101 may comprise a pair of leaf springs 116, 118 aligned with the control arms 102a, 102c. A first leaf spring 116 may be connected on a first end to the center section 102b proximate a location where the driver side control arm 102c connects to the center section 102b and connected on a second end to a first spring tower 204 on the driver side control arm 102c just inboard from the curvature leading to the second end that connects to the first spindle assembly 122. Similarly, a second leaf spring 118 may be connected on a first end to the center section 102b proximate a location where the passenger side control arm 102a connects to the center section 102b and connected on a second end to a second spring tower 202 on the passenger side control arm 102a just inboard from the curvature leading to the second end that connects the second spindle assembly 124. A first side 510 of the upper section 120 may be configured to connect to the second leaf spring 118 and an opposing second side 512 of the lower section may be configured to connect to the first leaf spring 116.

Figure 1:
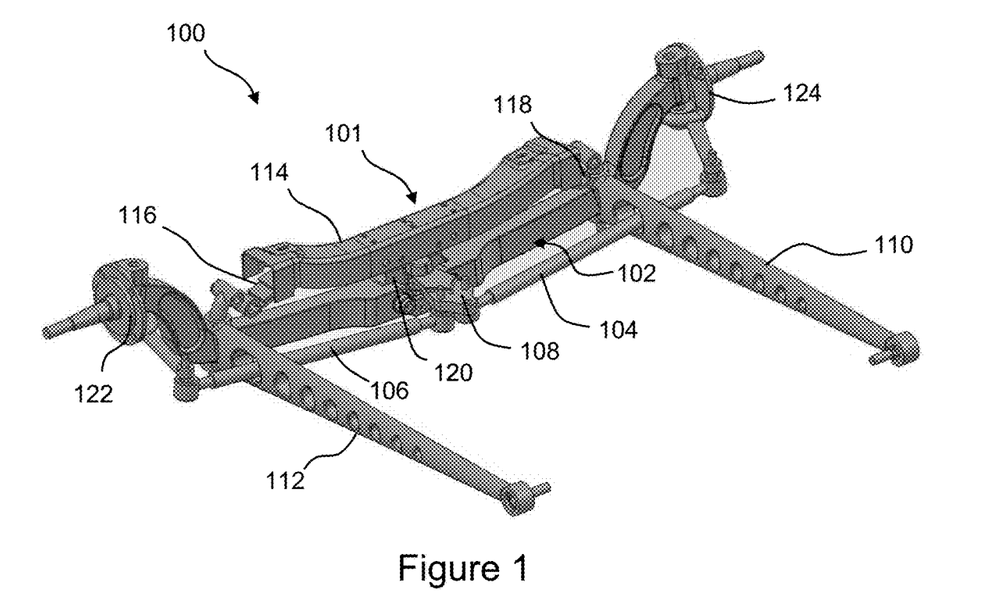
FIG. 1 representatively illustrates a rear top perspective view of a center pivot suspension system in accordance with an exemplary embodiment of the present technology.
Figure 2:
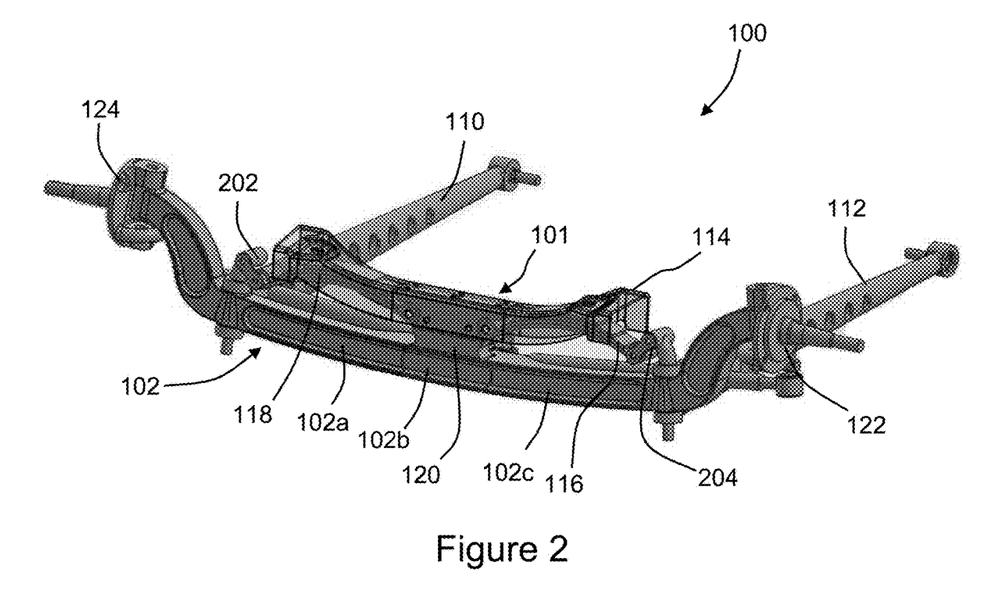
FIG. 2 representatively illustrates a top front perspective view of the center pivot suspension system showing a pair of leaf springs in accordance with an exemplary embodiment of the present technology.
Figure 3:
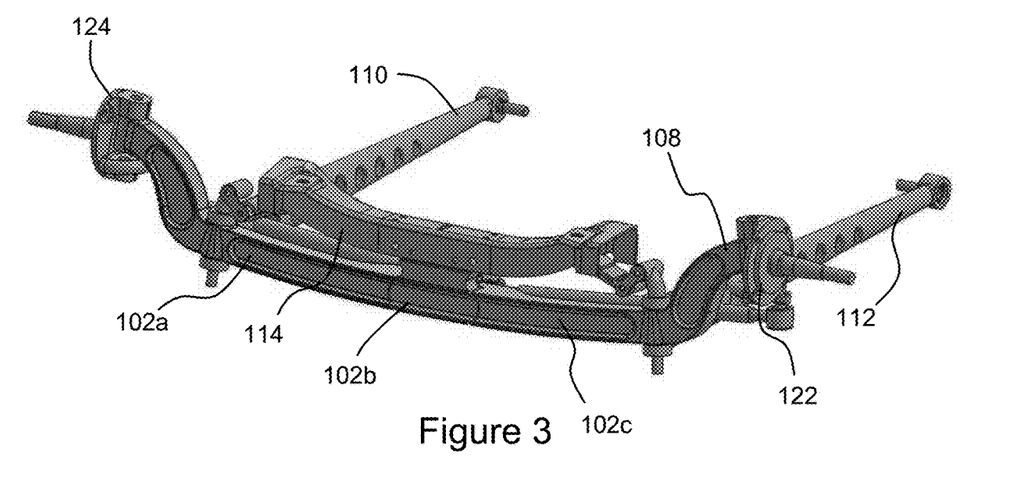
FIG. 3 representatively illustrates a top front perspective view of the center pivot suspension system showing a cover for the pair of leaf springs in accordance with an exemplary embodiment of the present technology.
Figure 4:
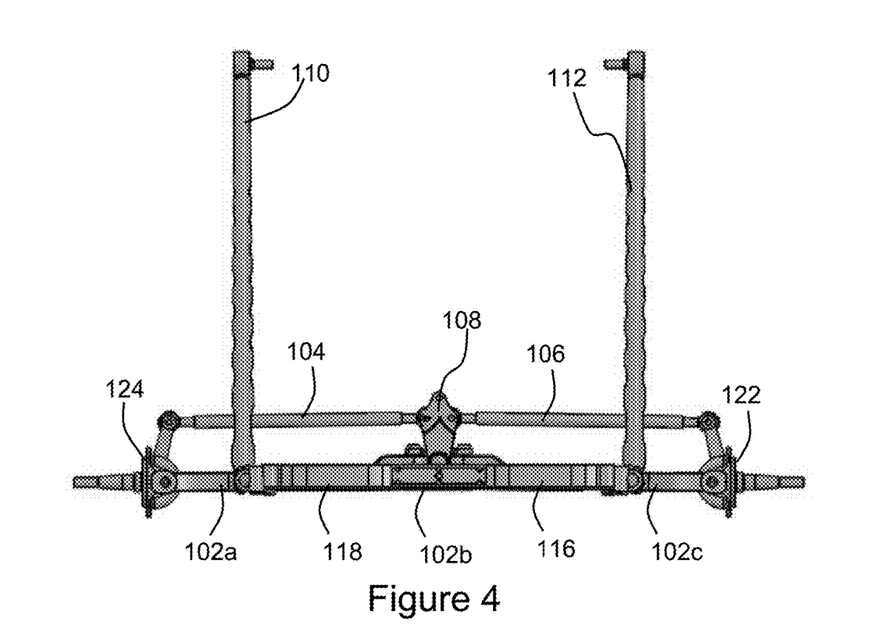
FIG. 4 representatively illustrates a top view of the center pivot suspension system in accordance with an exemplary embodiment of the present technology.
Figure 5:
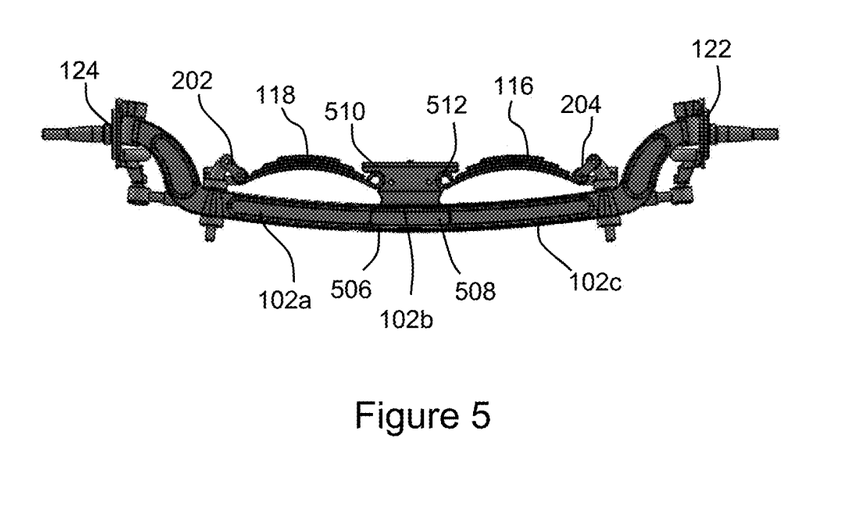
FIG. 5 representatively illustrates a front view of the center pivot suspension system in accordance with an exemplary embodiment of the present technology.
Figure 6:
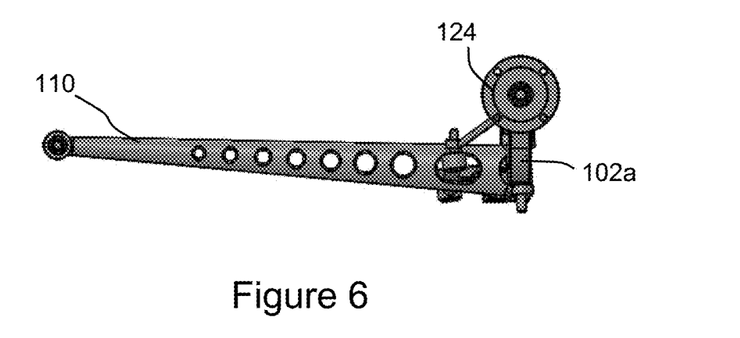
FIG. 6 representatively illustrates a side view of the center pivot suspension system in accordance with an exemplary embodiment of the present technology.

Each leaf spring 116, 118 may be positioned directly over its respective control arm 102c, 102a. For example, and referring now to FIGS. 5 and 8, an upper portion of the center section 102b may be configured to receive the ends of the leaf springs 116, 118 and hold them in place above the point where the control arms 102a, 102c are connected to the center section 102b. As shown in FIGS. 3 and 7, the suspension housing 114 may be connected to a top surface of the center section 102b such that the interior portion of the suspension housing 114 is positioned over the leaf springs 116, 118 to at least partially conceal them.

The first and second leaf springs 116, 118 may act independently from each other to help control an upward displacement of the corresponding control arm 102c, 102a under loading. This allows each control arm 102a, 102c to pivot relative to the center section 102b under the control of the attached leaf spring. Contrastingly, existing solid beam suspension systems use a single transverse spring connected to opposing ends of the solid beam (axle). The single leaf spring is only able to control upwards displacements to the entire solid beam resulting in a system that allows a displacement of one spindle assembly to also displace the opposing spindle assembly.

Referring now to FIGS. 1, 4, and 7-9, the steering link 108 may be connected to the center section 102b of the multi-section axle beam 102. The steering link 108 is used to transmit inputs from the steering wheel to the first and second spindle assemblies 122, 124 via the pair of steering linkages 104, 106. The steering link 108 may be pivotably connected to the center section 102b at a pivot point 704 to help decouple steering inputs from driving loads introduced to the multi-section axle beam 102 via the wheels.

These and other embodiments for methods for a center pivot steering system may incorporate concepts, embodiments, and configurations as described above. The particular implementations shown and described are illustrative of the technology and its best mode and are not intended to otherwise limit the scope of the present technology in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the components and/or elements recited in any apparatus embodiment may be assembled or otherwise operationally configured in a variety of permutations to produce substantially the same result as the present technology and are accordingly not limited to the specific configuration recited in the specific examples.

As used herein, the terms "comprises," "comprising," or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to exemplary embodiments. However, changes and modifications may be made to the exemplary embodiments without departing from the scope of the present technology. These and other changes or modifications are intended to be included within the scope of the present technology, as expressed in the following claims.

The invention claimed is:

1. A suspension system, comprising:
    an axle beam, comprising:
        a center section;
        a lower arm bridge configured to be connected to the center section and having a first end and a second opposing end;
        a first control arm pivotally connected on a first end to a first side of the center section via the first end of the lower arm bridge; and
        a second control arm pivotally connected on a first end to an opposite second side of the center section via the second opposing end of the lower arm bridge, wherein the second control arm extends outwardly away from the first control arm; and
    a spring control system positioned directly above the axle beam and connecting a second end of each control arm to the center section.

2. A suspension system according to claim 1, wherein the lower arm bridge connects the first and second control arms to a rear facing surface of the center section.

3. A suspension system according to claim 1, further comprising:
    a steering link assembly connected to the center section; and
    a pair of steering linkages, wherein:
        a first steering linkage extends from the steering link assembly to a first spindle assembly proximate the second end of the first control arm; and
        a second steering linkage extends from the steering link assembly to a second spindle assembly proximate the second end of the second control arm.

4. A suspension system according to claim 1, wherein the spring control system comprises:
    a first leaf spring connected on a first end to the center section proximate a location where the first control arm connects to the center section and a second end of the first leaf spring is connected proximate to the second end of the first control arm; and
    a second leaf spring connected on a first end to the center section proximate a location where the second control arm connects to the center section and a second end of the second leaf spring is connected proximate to the second end of the second control arm.

5. A suspension system according to claim 4, wherein:
    the second end of the first leaf spring is connected to a first spring tower on the first control arm; and
    the second end of the second leaf spring is connected to a second spring tower on the second control arm.

6. A suspension system according to claim 4, wherein:
    the first end of the first leaf spring is connected to an upper section of the first side of the center section; and
    the first end of the second leaf spring is connected to an upper section of the second side of the center section.

7. A suspension system according to claim 4, further comprising a suspension housing positioned over the first and second leaf springs and the center section.

8. A suspension system, comprising:
    an axle beam, comprising:
        a center section having an upper section and a lower section;
        a first control arm pivotally connected on a first end to a first side of the lower section of the center section; and
        a second control arm pivotally connected on a first end to an opposite second side of the lower section of the center section, wherein each control arm extends outwardly away from the center section; and
    a spring control system positioned directly above the axle beam, comprising:
        a first leaf spring connected on a first end to a first side of the upper section of the center section and connected on a second end to a first spring tower located on the first control arm, wherein the first and second ends of the first leaf spring are positioned directly above the first control arm; and
        a second leaf spring connected on a first end to a second side of the upper section of the center section and connected on a second end to a second spring tower located on the second control arm, wherein the first and second ends of the second leaf spring are positioned directly above the second control arm.

9. A suspension system according to claim 8, further comprising a lower arm bridge connecting the first and second control arms to the center section.

10. A suspension system according to claim 8, further comprising:
- a steering link assembly connected to the center section; and
- a pair of steering linkages, wherein:
    - a first steering linkage extends from the steering link assembly to a first spindle assembly proximate a second end of the first control arm; and
    - a second steering linkage extends from the steering link assembly to a second spindle assembly proximate a second end of the second control arm.

11. A suspension system according to claim 8, further comprising a suspension housing positioned over the first and second leaf springs and the center section.

12. A suspension system according to claim 8, wherein:
- the first control arm comprises an upwardly curving second end and the first spring tower is located inboard from and adjacent to the curving second end; and
- the second control arm comprises an upwardly curving second end and the second spring tower is located inboard from and adjacent to the curving second end.

* * * * *